Patented Dec. 14, 1948

2,456,360

UNITED STATES PATENT OFFICE 2,456,360

ACRYLONITRILE PROCESS

Harold Wilfred Arnold, Wilmington, Del., assignor to E. I. du Pont de Nemours & Company, Wilmington, Del., a corporation of Delaware No Drawing. Application August 9, 1944, Serial No. 548,782

3 Claims. (Cl. 260—83)

This invention relates to polymers of monounsaturated compounds and to a method for improving certain properties of these polymers. More specifically, it relates to a method for controlling and improving the film and fiber properties of polymers and copolymers produced from acrylonitrile.

Polyacrylonitrile and certain copolymers containing predominant amounts of combined acrylonitrile have been spun by adaptations of wet or dry processes to exceptionally strong fibers which show excellent outdoor durability and chemical resistance. Because of their high strength it has been desired to employ these fibers in the carcasses of heavy-duty truck tires and aircraft tires, in cordage, and in other applications which require high strength fibers whose tenacity is not greatly decreased at the elevated temperatures which may be developed during normal usage. Fibers from polyacrylonitrile which has been polymerized in a conventional manner have not been acceptable because of the decrease in tenacity at high temperatures. This invention has as an object the provision of a practical means for producing a very substantial improvement in the high temperature durability of films and fibers of polyacrylonitrile or copolymers containing predominant amounts of combined acrylonitrile. Other objects will appear hereinafter.

These objects are accomplished by the following invention wherein acrylonitrile either alone or in mixture with not more than 10% of at least one other copolymerizable monoethylenic compound is polymerized by any polymerization process in the presence of a monomeric dithioglycidol, e. g., dithioglycidol,

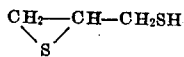

In practicing this invention any of the known polymerization methods may be used. In general, from about 0.01% to 2% of a dithioglycidol is employed, the amount used depending on the other reaction conditions. Larger amounts are detrimental and may completely halt the polymerization reaction. The invention is described and illustrated by the following examples, wherein parts are by weight.

EXAMPLE I

A mixture of 1000 parts of distilled water, 100 parts of acrylonitrile, and 0.1 part of dithioglycidol,

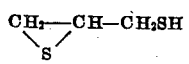

which may be prepared by the process of Signaigo Serial No. 498,879, filed September 20, 1943, is stirred in a vessel whose temperature is maintained at 35° C. Nitrogen is passed slowly over the surface of the liquid during the polymerization. A catalyst mixture consisting of one part of ammonium perdisulfate and 0.3 part of sodium bisulfite is added and the mixture thereafter stirred at 35° C. for 18 hours. The resulting polymer slurry is steamed to remove unpolymerized monomer and the polymer filtered, washed thoroughly with several changes of water, and dried at 30° C. The dried polymer amounts to 71 parts.

In an exactly analogous operation, except that the dithioglycidol is omitted, acrylonitrile is polymerized alone to give an 83% yield of polymer. The following table shows a comparison of certain of the properties of the modified and unmodified products. Tests are carried out on films which have been cast from 10% solutions in dimethyl formamide on glass surfaces heated to 80–90° C., stripped and heated at 80° C. for four hours and thereafter extracted with boiling water for thirty minutes to remove traces of residual dimethyl formamide.

Table I

| Polymer | Mol. wt.[1] | Sticking Temp.[2] | $T_B$ (p. s. i.)/$E_b$, percent [3] |
|---|---|---|---|
| Unmodified polymer | 117,000 | 191 | 37,300/12 |
| Dithioglycidol modified | 88,000 | 254 | 32,700/15 |

[1] The molecular weights here recorded are determined from viscosity measurements of 0.1% solutions in dimethyl formamide, using the relationship $$\frac{\eta sp}{C} = KmM$$

where $\eta sp$ = specific viscosity, C = the concentration in mols of monomer unit per liter of solution, and $Km$ is a constant whose value is $1.5 \times 10^{-4}$. The Staudinger equation in the above form is subject to a number of limitations and in the case of polyacrylonitrile the value of $Km$ is at best only an approximation. However, the molecular weights recorded above are valid for comparative purposes.

[2] The sticking temperature is determined on strips of film 0.3 inch wide and 0.001 inch thick by suspending the film over a brass block under sufficient tension to keep it about ¼ inch above the block. The block is heated at a rate of about 5° per minute and when the temperature reaches 120° C. the sample is brought into contact with the block under a 200 gram load for ten seconds. This procedure is repeated with every 5° rise in temperature until the point is reached at which the film fails to pull away from the block after the removal of the weight. This point is designated as the sticking temperature. During the intervals in which the sample is not in contact with the block an asbestos shield is placed between the block and the sample to minimize heat radiation.

[3] Determinations of tensile strength/elongation are carried out on a Model X-3 tester, manufactured by the Henry L. Scott Co., on films which have been stretched 1000% at 100° C., set under tension at 140° C. and relaxed at 120° C.

EXAMPLE II

A mixture of 100 parts of acrylonitrile with 0.1 part of dithioglycidol is polymerized exactly as in Example I except that the catalyst mixture consists of one part of ammonium perdisulfate and 0.5 part of sodium bisulfite. The reaction is interrupted at the conclusion of 2½ hours and the polymer isolated as in Example I, giving a yield of 79 parts. A duplicate experiment in which the dithioglycidol is replaced by 0.45% dodecyl mercaptan gives a yield of 82% of polymer in 2.5 hours. The following table compares the properties of films of the unmodified acrylonitrile polymer with those modified by dodecyl mercaptan and dithioglycidol. All tests are carried out on films which have been stretched, set, and relaxed as in Example I.

ethyl vinyl sulfone; ethylene, propylene, isobutylene, butene-1 and butene-2; alkyl vinyl ethers; vinylsulfonic acid; ethylene-alpha,beta - dicarboxylic acids or their anhydrides or derivatives such as diethyl fumarate, diethyl maleate, diethyl citraconate, diethyl mesaconate; styrene, vinylnaphthalene, and the like. For the purpose of this application, the copolymerization comonomers are those which undergo polymerization to the extent of at least 50% of the original mono- Table II

| Modifier | Mol. Wt. | $T_B$ (p. s. i.)/$E_B$, per cent | Temp. at 25% Elong.[1] | Break Temp.[1] Elong., per cent/(g./d. load) | Per cent of Original Tensile Strength[2] at— | |
|---|---|---|---|---|---|---|
| | | | | | 140° C. | 150° C. |
| None | 117,000 | 37,300-12 | 133 | Per cent 144-75 | 0 | 0 |
| Dithioglycidol (0.1%) | 57,000 | 30,300-12 | 160 | 166-80 | 93 | 86 |
| Dodecyl mercaptan (0.45%) | 113,000 | 32,700-12 | 140 | 157-138 | 62 | 43 |

[1] The temperature at 25% elongation is determined by suspending the film in a well insulated, electrically heated chamber under a load corresponding to one gram per denier. Heat is now applied at such rate that approximately 15 minutes are required to raise the temperature from 25° C. to 160° C. It has been found that the inflection point of the elongation-temperature curve occurs at approximately 25% elongation. This temperature corresponds to a thermal yield point and is useful in comparing various samples of polyacrylonitrile. Heating is continued beyond the thermal yield point until breakage occurs and the break temperature and per cent elongation at break are recorded.
[2] The determination of the variation in tensile strength with temperature is likewise carried out in the apparatus used in the determination of the temperature at 25% elongation. In making the test the sample is attached between the grips and held without tension until temperature equilibrium is established. The temperature is regulated by means of a Variac or similar variable resistance. A load is then applied in gradually increasing amounts, at a rate of 10 grams per second until breakage occurs. Several determinations are made at each temperature and the values are averaged. Curves are then drawn to give a graphical illustration of the variation in tensile strength with temperature. In the above table the outstanding performance of the dithioglycidol-modified polyacrylonitrile is illustrated by the fact that at a temperature as high as 150° C. the tensile strength is 86% of the tensile strength at 25° C.

EXAMPLE III

Acrylonitrile was polymerized exactly as in Example I to yield a polymer which was spun from dimethyl formamide solution by a dry spinning process. The resulting fibers after being stretched tenfold at 120° C. and then heated for two hours at 125° C. while in a skein had a dry tenacity of 4.6 grams per denier at 17% elongation and a loop tenacity of 3.9 grams per denier at 14% elongation. These values are considerably higher than those of fibers spun from unmodified polyacrylonitrile having approximately the same molecular weight.

In this invention dithioglycidols are used as modifiers or control agents in the polymerization of acrylonitrile either alone or in mixtures containing not more than 10% of at least one monoethylenically unsaturated compound which is copolymerizable with acrylonitrile. Such compounds include acrylic, alpha-chloroacrylic and methacrylic acids; methyl methacrylate, ethyl methacrylate, butyl methacrylate, octyl methacrylate, 2-nitro-2-methylpropyl methacrylate, methoxymethyl methacrylate, β-chloroethyl methacrylate, and the corresponding esters of acrylic and alpha-chloroacrylic acids; vinyl chloride, vinyl fluoride, vinyl bromide, vinylidene chloride, 1-chloro-1-bromoethylene, vinylidene bromide, 1-fluoro-1-chloroethylene, 1,1-difluoroethylene; methacrylonitrile, alpha-chloroacrylonitrile; acrylamide, methacrylamide, alpha-chloroacrylamide, or monoalkyl substitution products thereof; methyl vinyl ketone and methyl isopropenyl ketone; vinyl carboxylates such as vinyl acetate, vinyl chloroacetate, vinyl propionate, and vinyl stearate; N-vinyl imides such as N-vinylphthalimide, and N-vinylsuccinimide; methylenemalonic esters; itaconic acid and itaconic esters; trifluorochloroethylene; N-vinylcarbazole; 2-vinylpyridine, vinylfurane; butyl vinyl sulfone, mer weight when heated at 80° C. for 24 hours under autogenous pressure in the presence of 1% of benzoyl peroxide.

The invention is not limited to any particular polymerization process or catalyst. Thus, the methods of polymerization may include (1) aqueous dispersion, (2) solution in organic solvents, including solvents which are capable of dissolving the polymer and (3) bulk. All of these processes are adequately discussed in the prior art and are familiar to skilled workers. It is to be understood that the present invention is applicable to such processes whether they are conducted batchwise or in a continuous manner. For polymerizations carried out in aqueous systems, catalysts such as ammonium or alkali metal perdisulfates are usually employed, particularly at temperatures below about 50° C. Other inorganic water-soluble catalysts which may be used in aqueous systems include hydrogen peroxide, perborates, perphosphates, percarbonates and peracetates. For polymerizations in nonaqueous systems, which ordinarily involve temperatures somewhat above 50° C., catalysts which may be employed include benzoyl peroxide, acetyl benzoyl peroxide, lauroyl peroxide, succinyl peroxide, dibutyryl peroxide, tertiary butyl hydroperoxide and diethyl peroxide. The rate of polymerization may also be increased by exposure of the polymerization mixture to ultra-violet light and in such cases it is advantageous to add accelerators such as benzoin or diacetyl. In polymerizations carried out in aqueous systems, adjuvants selected from the class of inorganic sulfur compounds which yield sulfur dioxide on treatment with strong acid may be employed to assist in accelerating the polymerization. Such adjuvants include sodium bisulfite, sodium sulfite, sodium thiosulfate, and sodium hydrosulfite.

The concentration of modifier required to bring about the desired improvement in resistance to high temperature depends primarily on the conditions employed in the polymerization. In general, it appears desirable to approach as nearly as possible the maximum amount of dithioglycidol which can be tolerated without completely inhibiting the polymerization reaction. Although it is possible to employ from 0.01% to 2% of dithioglycidol modifier, it is preferred to use from 0.05% to 0.2% under the usual conditions.

It may be said as a general guide that, other factors being constant, the amount of modifier should be increased with increasing polymerization temperature. For example, if 0.1% of dithioglycidol is sufficient at a polymerization temperature of 5–10° C., as much as 2% can be used at a polymerization temperature of 100° C. to give approximately the same effect. At a constant temperature, e. g. 50° C., an increase in catalyst concentration will in general require an increase in modifier concentration. For example, the use of 0.2–0.5% of ammonium perdisulfate would call for 0.1–0.2% dithioglycidol, whereas 1–2% of catalyst would require 0.3–1% of dithioglycidol.

Among the nonaqueous media, which may be employed for the production of acrylonitrile polymer are acetone, benzene, dioxan, tert.-butanol, and methanol. With all of these solvents the polymer is precipitated from solution immediately as it is formed. It is likewise possible to use solvents which dissolve the polymer to give solutions directly spinnable without intermediate isolation of the product. Such solvents include dimethyl formamide and tetramethylene sulfone.

The polymers prepared in the presence of dithioglycidol show a considerably better color stability than unmodified polyacrylonitrile prepared under similar conditions. It has been the practice to spin polyacrylonitrile from solutions in dimethyl formamide and in order to prepare the dimethyl formamide solutions it is necessary to heat the mixture to about 120° C. to reach the concentration of the solids desired. In this step there is often a color change to yellow or amber which affects the color of the spun fibers. The presence of dithioglycidol very markedly reduces the tendency to undergo discoloration under these conditions.

The polyacrylonitrile modified during polymerization with dithioglycidol is used almost exclusively for the production of fibers. Copolymers of acrylonitrile with other polymerizale compounds, may be used in such applications as the production of moldings, films, foils and coatings.

The fibers spun from polyacrylonitrile modified with dithioglycidol are particularly applicable to uses in which resistance to high temperature is required, such as heavy duty tires, aircraft tires, ropes, cordage and the like.

The term "monoethylenically unsaturated" is used to denote the presence of one and only one carbon to carbon ethylenic, i. e. non-aromatic double bond.

Copolymers of acrylonitrile with up to 10% of a vinylpyridine form the subject of my copending application Serial No. 10,910, filed February 25, 1948.

The above description and examples are intended to be illustrative only. Any modification thereof or variation therefrom which conforms to the spirit of the invention is intended to be included within the scope of the claims.

What is claimed is:

1. In the process of polymerizing an acrylonitrile composition wherein the polymerizable portion is substantially entirely monoethylenically unsaturated and is at least 90% acrylonitrile the improvement which comprises carrying out the polymerization in the presence of from 0.01 to 2%, by weight of the polymerizable components, of dithioglycidol,

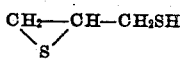

2. In the process of polymerizing an acrylonitrile composition wherein the polymerizable portion is substantially entirely acrylonitrile the improvement which comprises carrying out the polymerization in the presence of from 0.01 to 2%, by weight of the acrylonitrile, of dithioglycidol,

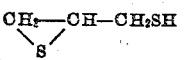

3. In the process of polymerizing an aqueous acrylonitrile dispersion wherein the polymerizable portion is substantially entirely monoethylenically unsaturated and is at least 90% acrylonitrile the improvement which comprises carrying out the polymerization in the presence of from 0.01 to 2%, by weight of the polymerizable components, of dithioglycidol,

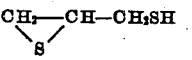

HAROLD WILFRED ARNOLD.

No references cited.